Jan. 6, 1942.    D. G. MERRILL    2,268,609
GLASSWARE LEHR
Filed July 8, 1939    2 Sheets-Sheet 2

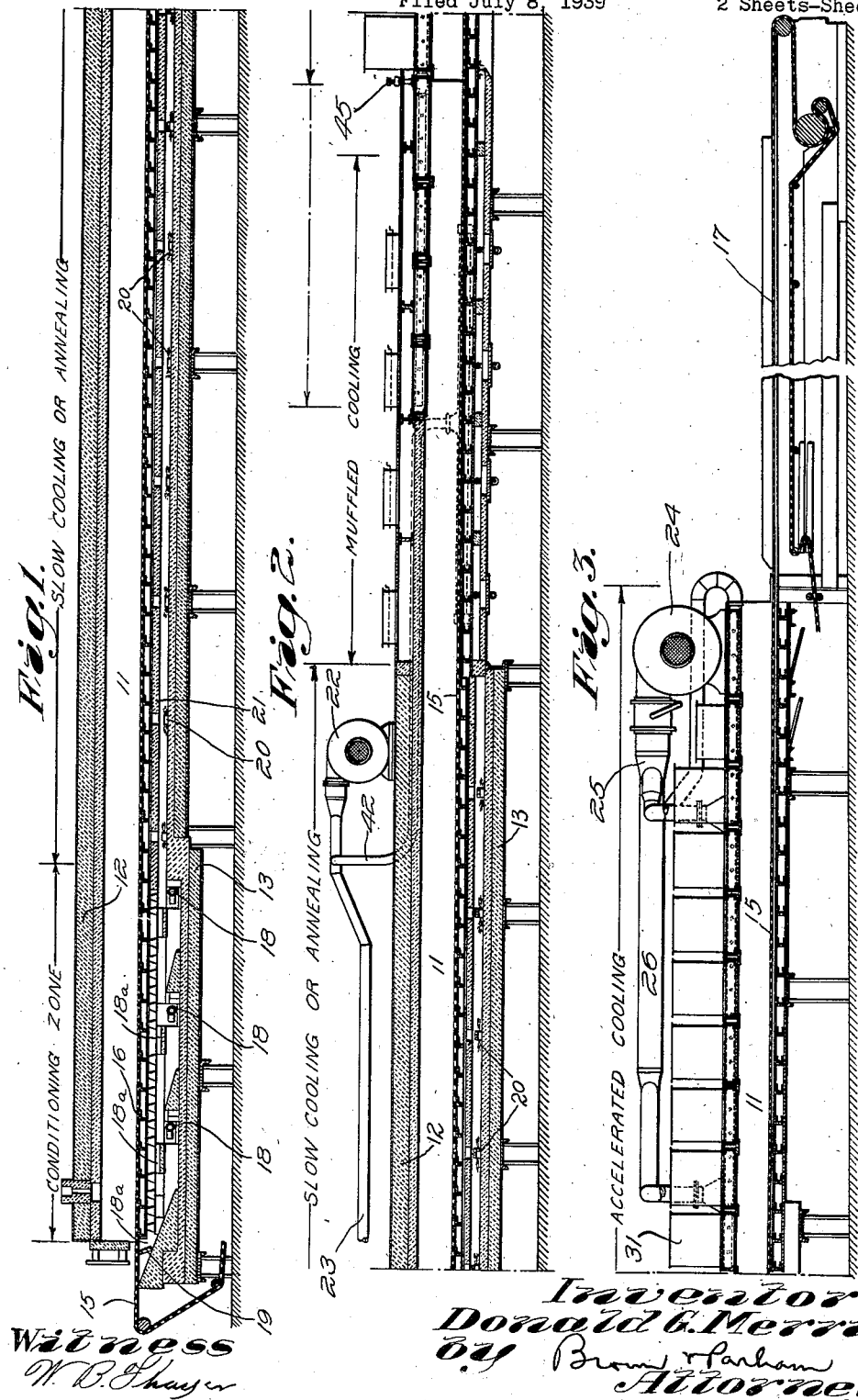

Witness
W. B. Thayer

Inventor
Donald G. Merrill
by Brown Parham
Attorneys

Patented Jan. 6, 1942

2,268,609

UNITED STATES PATENT OFFICE 2,268,609

GLASSWARE LEHR

Donald G. Merrill, West Hartford, Conn., assignor to Hartford-Empire Company, Hartford, Conn., a corporation of Delaware Application July 8, 1939, Serial No. 283,415

12 Claims. (Cl. 49—47)

The present invention relates to a method of and an apparatus for annealing glassware, such as bottles, jars and the like. The invention is an improvement upon the so-called "calorimeter" lehrs of the continuous tunnel type. Lehrs of the "calorimeter" type heretofore provided, comprised an elongate ware tunnel formed by walls of suitably graduated insulating material, through which tunnel the ware passed upon an openwork conveyor, preferably of woven wire construction. In these lehrs the glassware is first brought to a uniform high annealing temperature, then slowly cooled through its annealing range, and thereafter cooled to handling temperature at an accelerated rate. The heating and cooling arrangements are such as to cause relatively rapid circulation of heating and cooling gases within the ware tunnel itself.

Such lehrs have heretofore proven highly efficient in the annealing of hollow glassware in which great differences in the thickness of the various parts of the walls of the ware to be annealed do not exist. However difficulty has been found to exist in the employment of such lehrs in the annealing of large ware having relatively heavy bottoms which contain more heat than the other portions, when the temperatures of all parts of the bottles are substantially the same. When such ware leaves the heated section, it is at a uniform temperature somewhat below the lower annealing or critical temperature. On entering the cooling section, it is surrounded by turbulent air currents of lower temperature. The thin sides of the ware fall in temperature faster than the thick part of the bottom, resulting in excessive temporary strains at the junctures of the sides and bottom, which leads to cracking.

A principal object of the present invention is to improve the calorimeter type of lehr by providing means by which greater transfer of heat from the bottoms of the ware to its surroundings than from other portions of the glassware may be effected, so that the temperatures of all portions of the ware may be reduced at substantially the same rate.

Heretofore it has been customary to provide in calorimeter type lehrs a tunnel section separating the heated section from the accelerated cooling section in which cooling of the ware was determined to a major extent merely by the thermal characteristics of the surrounding walls. It is a further object of the present invention to provide in such section of a calorimeter type lehr means which in effect act to vary the character of these walls as desired, so as to permit a more perfect regulation of the temperature gradient within the tunnel, whereby the lehr is better adapted for annealing ware of varying types and amounts.

It is a further object of the present invention to provide in the intermediate section (between the sections in which rapid circulation of hot and cold gases is provided) a series of muffled passages surrounding the ware tunnel, through each of which cooling media may be passed in selected amounts, whereby the heat gradient in this section may be varied and controlled as desired.

A more specific object is to provide a tunnel section with muffled passages as aforesaid, in which the cooling media may be caused to flow either by natural draft or under pressure.

A further specific object of the invention is to provide, at least in a part of such cooling section, regulable means by which the cooling may be effected conjointly by a muffle cooling system and by direct circulation in the tunnel of additional cooling air. By the selected use of such means, together with the provisions for differential cooling of the bottoms and other portions of the ware, important variations of the cooling effect and of the differential between the cooling of different portions of the ware may be effected.

In the accompanying drawings I have illustrated one embodiment of my invention as applied to a calorimeter type lehr of the general character shown in my copending application Serial No. 66,611, filed March 2, 1936.

Figures 1, 2 and 3 of the drawings show a lehr of the calorimeter type in longitudinal central section, and indicate the functional division of such lehr into the several zones or stages of annealing, it being understood, of course, that the zones do not necessarily remain fixed within the exact sections of the structure as indicated on these figures, but may be differently located when ware of different types or amounts are being annealed.

Figure 6:
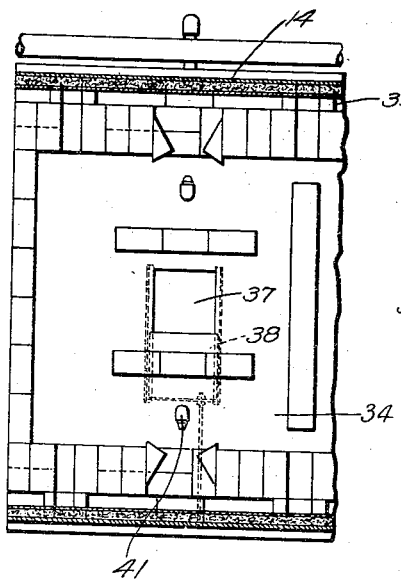
Fig. 6 is a horizontal section taken on the line 6—6 of Fig. 5.

As shown the lehr comprises an elongate substantially horizontal ware-annealing tunnel 11 formed of suitable refractory and heat insulated top 12, bottom 13 and side walls 14. A continuous openwork conveyor 15 has its ware-bearing strand carried through the tunnel upon a suitable openwork support, as the angles 16.

As indicated in Figs. 1, 2 and 3, the tunnel may be considered as functionally divided into a "conditioning" zone or section in which the glassware to be annealed is brought to substantially uniform temperature throughout all portions thereof; a "slow cooling or annealing" zone or section, in which the temperature of the ware is gradually and uniformly reduced from the high annealing to the low annealing temperature; a "muffled cooling" zone or section in which the ware is further reduced in temperature, and an "accelerated cooling" zone or section in which the ware is rapidly reduced in temperature to that at which it emerges from the lehr onto a packing table 17.

It is to be understood, of course, that these several zones of conditioning, slow cooling, etc., do not necessarily correspond functionally with the spacing in the lehr indicated on the drawings. The zones may overlap or shift in accordance with the weight and character of the ware to be annealed, the lehr being regulable to provide for annealing ware varying widely in character and amount.

Means for supplying heated gases to condition the glass, to control its slow cooling or annealing and to cause a rapid recirculation of the gases in these zones may be provided in a number of known ways. As shown in the particular embodiment illustrated in the drawings, the conditioning zone may contain three series of transversely spaced gas burners 18, the burners being directed toward and into semi-muffled passages extending longitudinally from the burners toward the entrance end of the lehr. The gases from these burners pass in selected amounts forwardly below the ware, upwardly through openings 18a and thence through the ware, thence generally rearwardly and thence downwardly through the ware, being recirculated in part by the induction effect of the burners. Selected amounts of said gases may be permitted to escape through the forward end of the lehr tunnel as determined by the setting of a damper 19.

In the slow cooling or annealing zone, gases of combustion are supplied by gas burners 20 located below the belt at or near the central longitudinal median line of the tunnel, and firing into passages formed by cover blocks 21 toward the side walls. The gases pass upwardly adjacent to the sides, thence toward the longitudinal median line of the tunnel, thence downwardly through the ware, being caused to recirculate by the induction effect of the burners. This circulation may be aided by jets of air under pressure from a fan 22 through a duct 23 introduced above and adjacent to the burners in the manner described in my copending application Serial No. 227,891, filed September 1, 1938. This feature, however, is per se no part of the present invention and hence is not further described herein.

Following the slow cooling or annealing section and as shown in Fig. 2, there is provided a muffle cooling section, the provision, arrangement and combination whereof with other portions of the lehr, constitute the principal improvement of the present invention. This section will be described in greater detail hereinafter.

As shown in Fig. 3, the final accelerated cooling section of the lehr is provided with a fan or blower 24 which is connected by suitable pipes 25—26 to a pair of pipes 27 and 28 located in the upper corners of the ware tunnel. These pipes are provided with nozzles 29 for directing air toward the longitudinal center line of the lehr against baffles 30 which direct the cooling air downwardly so that it passes through the ware on the conveyor, thence beneath the ware toward the side walls and then upwardly to be reincorporated in the stream of air from the nozzles. Suitable dampered openings (not shown) may be provided in the baffles 30 to permit escape of part of the cooling air to and through dampered controlled take-off stacks 31. The cooling arrangements, as shown, are substantially the same as those disclosed in my copending application Serial No. 66,611.

Figure 5:
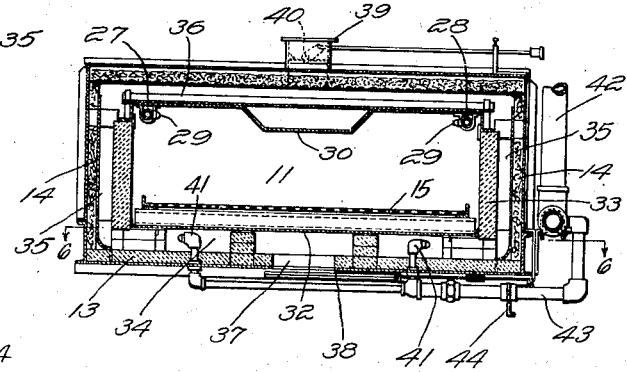
Fig. 5 is a transverse section taken on the line 5—5 of Fig. 4.
Figure 4:
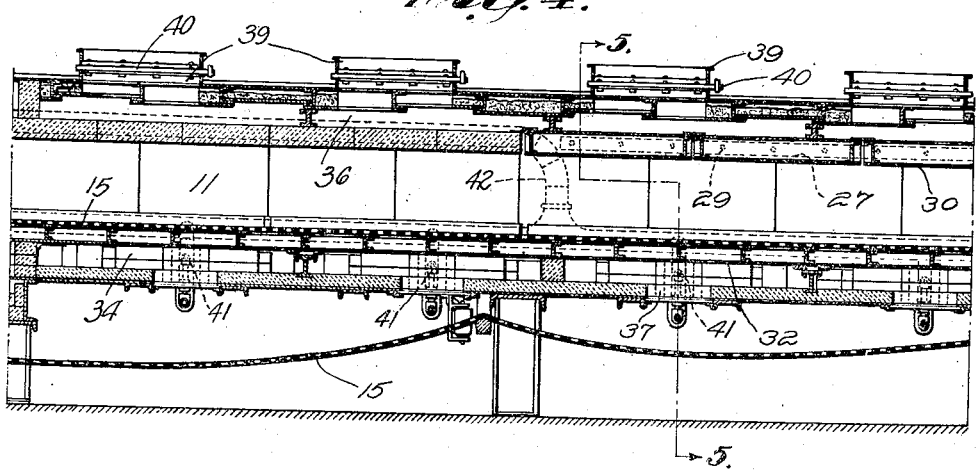
Figure 4 is an enlargement of a portion of Fig. 2 showing the muffled cooling section in greater detail.

As shown more particularly in Figs. 2, 4, 5 and 6, the muffle cooling section of the lehr comprises a longitudinally extending series of transverse muffle passages surrounding the ware chamber 11. Preferably the walls common to the passages and the ware tunnel 11 are of such character as to provide a differential exchange of heat between the ware being cooled and the gases in the muffle chambers. For example, the bottom wall 32 of the ware tunnel may be made of metal, while the side and/or top walls may be made of semi-insulating material; or the walls may be of unequal thickness. These interior walls, with the outer insulated walls, form bottom passages 34, side passages 35 and top passages 36. The bottom passages 34 may be provided with openings 37 controlled by dampers 38 for the admission of atmospheric air into the muffles.

Stacks 39 controlled by dampers 40 communicating with openings into the upper passages 36 are provided for controllably venting gases in the muffle passages to the atmosphere. By these means, atmospheric air may be drawn into and passed through each muffle in controlled amounts. Thus the cooling effect of the adjacent muffle sections may be individually regulated to give the desired temperature gradient in the ware being annealed.

Means may be provided for accelerating the movement of cooling fluid in the muffle and hence the cooling effect of the muffle. Such means may comprise nozzles 41 located in the lower muffle passage 34, to which nozzles air under pressure may be supplied as from the fan 22 through pipes 42—43 and under the control of valves 44.

In designing and constructing a lehr according to the present invention, when it is desired to obtain further variation of the cooling, effective on the ware in a portion of the muffle cooling zone, the cooling pipes 27—28 with the nozzles 29 may be extended forwardly into the muffle cooling section and cooling air may thereby be admitted into the ware tunnel to the extent determined by the setting of valves 45, Fig. 2.

As the exterior walls of the muffle are suitably insulated, the muffle section may be employed when desired to restrict the cooling, as in the intermediate section of the prior calorimeter lehrs, by closing the dampers 38 and 40.

It will thus be seen that by the provisions shown and described, a very highly selective, finely controlled and, if desired, differential cooling may be effected in the muffled cooling section, and the cooling may be varied to suit a great variety of types and amounts of ware passing through the tunnel in a given time.

The improvement is peculiarly advantageous in the annealing of ware having relatively heavy bottoms and lighter side walls, in that such ware arriving at the muffle cooling section at a substantially uniform temperature may be caused to lose heat more rapidly from the bottom thick portions which contain more heat units than the sides.

The arrangements are such that the transition of the ware from one temperature to another is a smooth and gradual one, and provides against sharp differences in temperature in different portions of the ware.

Having described my invention, what I claim is:

1. A glassware annealing lehr comprising an elongate ware tunnel, an openwork ware conveyor passing therethrough, means associated with the entrance end of said tunnel for supplying heated gases directly to and rapidly circulating them within the tunnel and about the ware on the conveyor, a series of independent muffles surrounding a subsequent section of said ware tunnel adapted for operation simultaneously with the circulation of heated gases as aforesaid, and means for passing cooling gases in the muffles around the said section of the ware tunnel for cooling the glassware.

2. A calorimeter type tunnel lehr comprising an elongate ware tunnel, means adjacent to the ends thereof respectively for introducing and circulating hot and cool gases within the ware tunnel, a series of independent muffle sections intermediate the length of the tunnel, each comprising passages at the bottom, sides and top of the tunnel, dampered means for controlling the admission of air to the muffle passages, and dampered means for permitting exit of air from said passages.

3. A glassware annealing lehr comprising an elongate ware tunnel, an openwork conveyor passing therethrough, means associated with a section of the tunnel adjacent to the entrance end thereof for introducing circulating heated gases in the tunnel and about the ware on the conveyor, a muffled cooling section intermediate the length of the lehr including muffled passages surrounding the tunnel, an accelerated cooling section adjacent the exit end of the lehr in which cooling air is circulated in the tunnel and about the ware, means associated with the muffled cooling section for selectively and controllably admitting air to the muffled passages beneath the path of the ware and for removing it from the portions of the muffle passages above the path of the ware, and other means for applying air under pressure in said passages, whereby the extent and intensity of cooling in the muffled section may be accelerated.

4. A lehr of the calorimeter type comprising a tunnel having a forward heating portion adjacent to the entrance end and an accelerated cooling section adjacent to the exit end, in both of which the gases are positively circulated in a predetermined manner, an intermediate tunnel section comprising a series of separated muffle passages surrounding the tunnel, means for introducing cooling fluid into each of the muffle passages, and means associated with each of said passages for independently regulating the passage of cooling gases therethrough.

5. A calorimeter type tunnel lehr comprising an elongate ware tunnel, means adjacent to the ends thereof respectively for circulating hot and cool gases within the ware tunnel in a predetermined manner and in contact with the glassware passing therethrough, a muffle section intermediate the length of the tunnel comprising passages at the bottom, sides and top thereof, the interior walls of said muffle forming the bottom of the ware tunnel being of higher heat conductivity than other walls of the muffle, dampered means for passing air by natural draft through said muffle passages in regulated quantities, means for blowing cooling air under pressure through said passages to accelerate the cooling, and valves for controlling the extent of said acceleration.

6. A glass ware annealing lehr of the calorimeter tunnel type comprising a tunnel, means for circulating heating and cooling gases respectively in forward and rearward sections thereof, a glassware conveyor passing therethrough, an intermediate tunnel section surrounded by muffle passages, means for selectively passing air by natural draft through said passages, means for blowing air under pressure through said passages, and means spaced longitudinally of the lehr for separating the passages from each other and into independently controllable sections.

7. A glassware annealing lehr comprising an elongate ware tunnel, an openwork conveyor passing therethrough, means located adjacent to the ware-receiving end of the lehr for supplying heated gases to and recirculating them in the ware tunnel, a muffle surrounding a subsequent section of said ware tunnel and having walls of higher conductivity at the bottom of said tunnel than at the sides and top thereof, whereby the rate of extraction of heat from the bottoms of said ware may be accelerated beyond that of extracting heat from the other portions of the ware, and means for passing cooling gases through said muffle.

8. A calorimeter type tunnel lehr comprising an elongate ware tunnel and means adjacent to the ends thereof respectively for circulating hot and cool gases within the ware tunnel in direct contact with the ware passing therethrough, a muffle section intermediate the length of the tunnel comprising passages at the bottom, sides and top, the interior walls of said muffle forming the bottom of the ware tunnel being of higher heat conductivity than the other walls of the muffle, and dampered means for passing air through said muffle passages in regulated quantities.

9. A calorimeter type continuous glassware annealing lehr comprising a ware tunnel having a forward section in which the glassware may be brought to a uniform heat condition and slowly cooled by gases of combustion circulated within the tunnel in direct contact with the ware passing therethrough, a tunnel section adjacent thereto, muffled passages passing transversely of the tunnel beneath, above and on the sides of the ware, said passages having walls beneath the ware of greater heat conductivity than at the sides and top, and means for passing cooling fluid through said passages at controlled and variable rates.

10. A lehr for annealing glassware comprising an elongate ware tunnel, an openwork conveyor passing therethrough, means effective in a portion of the tunnel adjacent to the ware-receiving end of the lehr for rapidly circulating heated gases in said ware tunnel in direct contact with the ware passing therethrough, means effective in a portion of the tunnel adjacent to the exit end of the lehr for rapidly circulating cooling gases in the tunnel in direct contact with the ware passing therethrough, muffled cooling means associated with an intermediate portion of the lehr, and means also effective in said intermediate portion for directly introducing and circulating cooling gases in the ware tunnel and about and in direct contact with the ware.

11. A lehr for annealing glassware comprising an elongate ware tunnel, an openwork conveyor passing therethrough, means effective in a portion of the tunnel adjacent to the ware-receiving end of the lehr for rapidly circulating heated gases in said ware tunnel in direct contact with the ware passing therethrough, means effective in a portion of the tunnel adjacent to the exit end of the lehr for rapidly circulating cooling gases in the tunnel in direct contact with the ware passing therethrough, muffled passages at an intermediate portion of the lehr having walls common with the ware tunnel of differing heat conductivities, means for passing a cooling medium through said passages, and means located at least in part in said intermediate portion of said lehr for directly introducing and circulating a cooling medium in the ware tunnel in direct contact with the ware passing therethrough, and means for variably regulating the cooling gases passing through the muffled passages and those introduced into the ware tunnel.

12. A glassware annealing lehr comprising an elongate tunnel, an openwork ware conveyor passing therethrough, means associated with the entrance end portion of the tunnel for introducing hot gases into the tunnel in direct contact with the ware passing therethrough and for circulating such gases therein in a predetermined manner, means associated with the exit end portion of the tunnel for introducing cooling gases directly into the tunnel in direct contact with the ware and for circulating such gases therein in a predetermined manner, a muffle surrounding an intermediate portion of the ware tunnel and means for passing a cooling medium within the muffle to cool the glassware on the conveyor while it is passing through said intermediate portion.

DONALD G. MERRILL.